(12) United States Patent
Khurana et al.

(10) Patent No.: US 12,316,611 B2
(45) Date of Patent: May 27, 2025

(54) ENHANCED SECURITY FOR EXISTING PUBLIC KEY INFRASTRUCTURE

(71) Applicant: NTT Research, Inc., Sunnyvale, CA (US)

(72) Inventors: Dakshita Khurana, Champaign, IL (US); Brent Waters, Austin, TX (US)

(73) Assignees: NTT Research, Inc., Sunnyvale, CA (US); The Board of Trustees of the University of Illinois, Urbana, IL (US)

( * ) Notice: Subject to any disclaimer, the term of this patent is extended or adjusted under 35 U.S.C. 154(b) by 52 days.

(21) Appl. No.: 18/040,215

(22) PCT Filed: Aug. 1, 2021

(86) PCT No.: PCT/US2021/044108
§ 371 (c)(1),
(2) Date: Feb. 1, 2023

(87) PCT Pub. No.: WO2022/031563
PCT Pub. Date: Feb. 10, 2022

(65) Prior Publication Data
US 2024/0267198 A1    Aug. 8, 2024

Related U.S. Application Data

(60) Provisional application No. 63/059,995, filed on Aug. 1, 2020.

(51) Int. Cl.
*H04L 9/40* (2022.01)
*H04L 9/08* (2006.01)
(52) U.S. Cl.
CPC ........ *H04L 63/0428* (2013.01); *H04L 9/0869* (2013.01)

(58) Field of Classification Search
CPC . H04L 9/14; H04L 9/006; H04L 9/002; H04L 9/0662; H04L 9/0656; H04L 9/065;
(Continued)

(56) References Cited

U.S. PATENT DOCUMENTS

2001/0033656 A1\* 10/2001 Gligor .................. H04L 9/0637
380/28
2003/0026429 A1    2/2003 Hammersmith
(Continued)

FOREIGN PATENT DOCUMENTS

DE    102010018838 A1 \* 11/2011   .......... H04L 9/0643
WO    2016/073058 A2    5/2016

OTHER PUBLICATIONS

Camenisch et al. "A public key encryption scheme secure against key dependent chosen plaintext and adaptive chosen ciphertext attacks." Annual International Conference on the Theory and Applications of Cryptographic Techniques. Springer, Berlin, Heidelberg, 2009. Apr. 26, 2009 (Apr. 26, 2009) Retrieved on Oct. 14, 2024 from <https://link.springer.com/chapter/10.1007/978-3-642-01001-9_20>.

(Continued)

*Primary Examiner* — Alexander Lagor
*Assistant Examiner* — Brandon Binczak
(74) *Attorney, Agent, or Firm* — CipherLaw

(57) ABSTRACT

Systems, methods, network devices, and machine-readable media disclosed herein perform chosen ciphertext attack secure encryption given any public key infrastructure that has been established with only chosen plaintext attack security. The resulting chosen ciphertext attack secure encryption makes black-box use of the chosen plaintext attack secure scheme and other underlying primitives, and specifically new public keys do not need to be created or distributed.

20 Claims, 9 Drawing Sheets

(58) Field of Classification Search
CPC ....... H04L 9/06; H04L 9/0841; H04L 9/0869; H04L 63/0428; G06F 21/602; G06F 21/60; G06F 21/00
See application file for complete search history.

(56) References Cited

U.S. PATENT DOCUMENTS

| | | |
|---|---|---|
| 2005/0198490 A1 | 9/2005 | Jaganathan et al. |
| 2011/0211691 A1 | 9/2011 | Minematsu |
| 2012/0008767 A1 | 1/2012 | Smith et al. |
| 2012/0300930 A1* | 11/2012 | Jutla .................. H04L 9/0869 380/262 |
| 2017/0373834 A1* | 12/2017 | Mandal ................ H04L 9/008 |

OTHER PUBLICATIONS

International Preliminary Report on Patentability, Written Opinion, and International Search Report in PCT/US2021/044108; 21 pgs.

* cited by examiner

KeyGen($1^\kappa$): The KeyGen algorithm outputs a public key cca.pk.

CCA.Enc(cca.pk, $m \in \{0,1\}^\ell$): The encryption algorithm does the following:

1. It runs RetrieveParam(cca.pk) $\to \kappa$ and then calculates $\kappa' = \kappa^c$.
2. It samples (HPRG.pp, $1^n$) $\leftarrow$ HPRG.Setup($1^\lambda, 1^\ell$).
3. It then chooses $s \leftarrow \{0,1\}^n$.
4. For each $i \in [n]$, it chooses random $r_i \leftarrow \{0,1\}^\ell$ and sets $\tilde{r}_i = $ HPRG.Eval(HPRG.pp, $s, i$).
5. For each $i \in [n]$, it chooses $v_i \leftarrow \{0,1\}^\kappa$.
6. For each $i \in [n]$, let $\sigma_i = $ Equiv.Com($1^\kappa, s_i; v_i$), and $y_i = s_i || v_i$.
7. It sets $c = $ HPRG.Eval(HPRG.pp, $s, 0$) $\oplus m$ and for each $i \in [n]$:
   - If $s_i = 0$, it sets $c_{0,i} = $ CPA.Enc(cpa.pk, $y_i; \tilde{r}_i$), $c_{1,i} = $ Com($1^{\kappa'}, y_i; r_i$).
   - If $s_i = 1$, it sets $c_{0,i} = $ CPA.Enc(cpa.pk, $y_i; r_i$), $c_{1,i} = $ Com($1^{\kappa'}, y_i; \tilde{r}_i$).
8. Finally, it outputs $\left(\text{HPRG.pp}, 1^n, c, (c_{0,i}, c_{1,i}, \sigma_i)_{i \in [n]}\right)$ as the ciphertext.

Fig. 2

PKE.Find(cca.pk, cca.sk, cca.ct)

Inputs: Public Key cca.pk = cpa.pk
Secret Key cca.sk = cpa.sk
Ciphertext cca.ct = $\left(\text{HPRG.pp}, 1^n, c, (c_{0,i}, c_{1,i}, \sigma_i)_{i \in [n]}\right)$

Output: $d \in \{0,1\}^n$

- Let $\kappa = \text{RetrieveParam(cpa.pk)}$.
- For each $i \in [n]$, do the following:
  1. Let $m_i = \text{CPA.Dec(cpa.sk}, c_{0,i})$.
  2. If $m_i = 0 | p_i$ and $\sigma_i = \text{Equiv.Com}(1^\kappa, 0; v_i)$, set $d_i = 0$. Else set $d_i = 1$.
- Output $d = d_1 d_2 \ldots d_n$.

Fig. 3

PKE.Check(cca.pk, cca.ct, d)

Inputs: Public key cca.pk = cpa.pk

Ciphertext cca.ct = $\left(\text{HPRG.pp}, 1^n, c, (c_{0,i}, c_{1,i}, \sigma_i)_{i \in [n]}\right)$ $d \in \{0,1\}^n$

Output: msg $\in \{0,1\}^\ell \cup \bot$

- Let $\kappa$ = RetrieveParam(cpa.pk). Compute $\kappa' = \kappa^c$.
- Let flag = true. For $i = 1$ to $n$, do the following:
  1. Let $\tilde{r}_i$ = HPRG.Eval(HPRG.pp, $d, i$).
  2. If $d_i = 0$, let $m \leftarrow$ CPA.Recover(cpa.pk, $c_{0,i}, \tilde{r}_i$). Parse $m = (s'|v')$ and perform the following checks. If any of the checks fail, set flag = false and exit loop.
     – $s' = 0$, CPA.Enc(cpa.pk, $m; \tilde{r}_i$) = $c_{0,i}$.
     – $\sigma_i$ = Equiv.Com($1^\kappa, s', v'$).
  3. If $d_i = 1$, let $m \leftarrow$ Com.Recover($1^\kappa, c_{1,i}, \tilde{r}_i$). Parse $m = (s'|v')$ and perform the following checks. If any of the checks fail, set flag = false and exit loop.
     – $s' = 1$, CPA.Enc(cpa.pk, $m; \tilde{r}_i$) = $c_{1,i}$.
     – $\sigma_i$ = Equiv.Com($1^\kappa, s', v'$).
- If flag = true, output $c \oplus$ HPRG.Eval(HPRG.pp, $d, 0$). Else output $\bot$.

Fig. 4

KeyGen($1^\kappa$): The KeyGen algorithm outputs a public key cca.pk.

CCA.Enc(cca.pk, $m \in \{0,1\}^\ell$): The encryption algorithm is as follows:

1. It runs RetrieveParam(cca.pk) $\to \kappa$ and then calculates $\kappa' = \kappa^3$.
2. It samples (HPRG.pp, $1^n$) $\leftarrow$ HPRG.Setup($1^\lambda, 1^\ell$).
3. It then chooses $s \leftarrow \{0,1\}^n$.
4. For each $i \in [n]$, it chooses random $r_i \leftarrow \{0,1\}^\ell$ and sets $\widetilde{r}_i =$ HPRG.Eval(HPRG.pp, $s, i$).
5. For each $i \in [n]$, it chooses $v_i \leftarrow \{0,1\}^\kappa$. It sets $\sigma_i =$ Equiv.Com($1^\kappa, s_i; v_i$), and $y_i = s_i \| v_i$.
6. It sets $c =$ HPRG.Eval(HPRG.pp, $s, 0$) $\oplus m$ and for each $i \in [n]$
   - If $s_i = 0$, $c_{0,i} =$ CPA.Enc(cpa.pk, $y_i; \widetilde{r}_i$), $c_{1,i} =$ CCA.Com($1^{\kappa'}, vk, y_i; r_i$).
   - If $s_i = 1$, $c_{0,i} =$ CPA.Enc(cpa.pk, $y_i; r_i$), $c_{1,i} =$ CCA.Com($1^{\kappa'}, vk, y_i; \widetilde{r}_i$).[3]
7. It sets $\alpha = \Big($HPRG.pp, $1^n, c, (c_{0,i}, c_{1,i}, \sigma_i)_{i \in [n]}\Big)$.
8. It samples $(vk, sk) \leftarrow$ Signature.Setup($1^{\kappa'}$).
9. Finally, it computes $\tau =$ Sign($sk, \alpha$), and outputs $(vk, \alpha, \tau)$ as the ciphertext.

Fig. 5

PKE.Find(cca.pk, cca.sk, α)

Inputs: Public Key cca.pk = cpa.pk
Secret Key cca.sk = cpa.sk
Ciphertext $\alpha = \left(\text{HPRG.pp}, 1^n, c, (c_{0,i}, c_{1,i}, \sigma_i)_{i \in [n]}\right)$

Output: $d \in \{0,1\}^n$

- Let $\kappa = \text{RetrieveParam}(\text{cpa.pk})$.
- For each $i \in [n]$, do the following:
  1. Let $m_i = \text{CPA.Dec}(\text{cpa.sk}, c_{0,i})$.
  2. If $m_i = 0 \| \tau_i$ and $\sigma_i = \text{Equiv.Com}(1^\kappa, 0; \tau_i)$, set $d_i = 0$. Else set $d_i = 1$.
- Output $d = d_1 d_2 \ldots d_n$.

Fig. 6

PKE.Check(cca.pk, cca.ct, d)

Inputs: cca.pk = cpa.pk, cca.ct = $(vk, \alpha, \tau)$ where
$$\alpha = \left(\text{HPRG.pp}, 1^\kappa, c, (c_{0,i}, c_{1,i}, \sigma_i)_{i \in [n]}\right), d \in \{0,1\}^n$$

Output: msg $\in \{0,1\}^\kappa \cup \bot$

- Let $\kappa =$ RetrieveParam(cpa.pk). Compute $\kappa' = \kappa^e$.
- Let flag = true. For $i = 1$ to $n$, do the following:
  1. Let $\tilde{r}_i =$ HPRG.Eval(HPRG.pp, $d, i$).
  2. If $d_i = 0$, let $m \leftarrow$ CPA.Recover(cpa.pk, $c_{0,i}, \tilde{r}_i$). Parse $m = (s'|v')$ and perform the following checks. If any of the checks fail, set flag = false and exit loop.
     - $s' = 0$, CPA.Enc(cpa.pk, $m; \tilde{r}_i) = c_{0,i}$.
     - $\sigma_i =$ Equiv.Com($1^\kappa, s'; v'$).
  3. If $d_i = 1$, let $m \leftarrow$ CCACom.Recover($1^\kappa, c_{1,i}, \tilde{r}_i$). Parse $m = (s'|v')$ and perform the following checks. If any of the checks fail, set flag = false and exit loop.
     - $s' = 1$, CCA.Com($1^\kappa, vk, m; \tilde{r}_i) = c_{1,i}$.
     - $\sigma_i =$ Equiv.Com($1^\kappa, s'; v'$).
- If flag = true, output $c \oplus$ HPRG.Eval(HPRG.pp, $d, 0$). Else $\bot$.

Fig. 7

ENHANCED SECURITY FOR EXISTING PUBLIC KEY INFRASTRUCTURE

CROSS-REFERENCE TO RELATED APPLICATIONS

This application is a national stage application, filed under 35 U.S.C. § 371, of International Patent Application No. PCT/US2021/044108, filed Aug. 1, 2021, which claims the benefit of U.S. Provisional Application No. 63/059,995 filed Aug. 1, 2020, the contents of both of which are hereby incorporated in their entireties.

FIELD OF THE INVENTION

The present disclosure relates to systems, methods, network devices, and machine-readable media for converting a chosen plaintext attack (CPA)-secure encryption scheme to one that is chosen ciphertext attack (CCA)-secure.

BACKGROUND OF THE INVENTION

Encryption schemes may be considered to be secure with respect to, among other types of attacks, CPA and CCA. In general, under CPA, an attacker recovers information after causing the encryption of arbitrary plaintext in the encryption scheme. Under CCA, an attacker recovers information after causing the decryption of ciphertexts in the encryption scheme. Encryption schemes embodying CCA security are considered to be stronger than those merely embodying CPA security. Semantic security, or equivalently indistinguishability-based security against CPA would requires that encryptions of every pair of plaintexts appear indistinguishable to a computationally bounded attacker.

Over the years, multiple encryption schemes have been developed that satisfy CPA security alone. Unfortunately, starting with the attacks of Bleichenbacher against PKCS #1, it was quickly realized that systems that only satisfy CPA security often fail in practice. A recent example that gained some popularity is the messaging service Telegram, that supplies end-to-end encryption using a new protocol employing AES, RSA, and Diffie-Hellman key exchange. Recently, it was shown that this protocol is not CCA secure.

CCA security has been accepted as the standard requirement from encryption schemes that need to withstand active attacks. This guarantees security even against attackers that make oracle decryption queries to keys they do not have.

The shortcomings of CPA security are particularly relevant to previously deployed public key encryption schemes in the field. Deployed encryption schemes, such as widely deployed PKI schemes, may be only CPA secure. Chosen-plaintext attacks are particularly relevant in the context of public key cryptography, where the encryption key is public so attackers can encrypt any plaintext they choose.

Thus there is a need for means to achieve CCA security using keys for cryptosystems that were originally deployed while only satisfying CPA security, without having to modify those public keys that have already been distributed. This would allow parties with access to public key infrastructures that have been established with only CPA security in mind to use these infrastructures to perform CCA secure encryption instead.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings:

FIG. 2 illustrates an example set of executable instructions for generating a CCA1-secure ciphertext from a CPA-secure encryption scheme.

FIG. 3 illustrates an example set of instructions for decrypting a CCA1-secure ciphertext.

FIG. 4 illustrates an example set of instructions for checking a decrypted CCA1-secure ciphertext.

FIG. 5 illustrates an example set of executable instructions for generating a CCA2-secure ciphertext from a CPA-secure encryption scheme.

FIG. 6 illustrates an example set of instructions for decrypting a CCA2-secure ciphertext.

FIG. 7 illustrates an example set of instructions for checking a decrypted CCA2-secure ciphertext.

DETAILED DESCRIPTION

Disclosed herein are systems and methods for adapting existing public key infrastructure (PKI) to be more secure. Specifically, existing PKI that is only CPA-secure can thereby be adapted to be CCA-secure.

As used herein, if the adversary only has access to a decryption oracle before obtaining the challenge ciphertext, the resulting scheme is said to be CCA1 secure. On the other hand, if the adversary has access to the decryption oracle both before and after obtaining the challenge ciphertext, the resulting scheme is said to be CCA2 secure. Multiple embodiments of the invention are described herein which can variously operate to adapt existing infrastructure to be either CCA1 or CCA2 secure. Each of the adaptations has corresponding encryption and decryption functions, described in more detailed herein.

Figure 1:
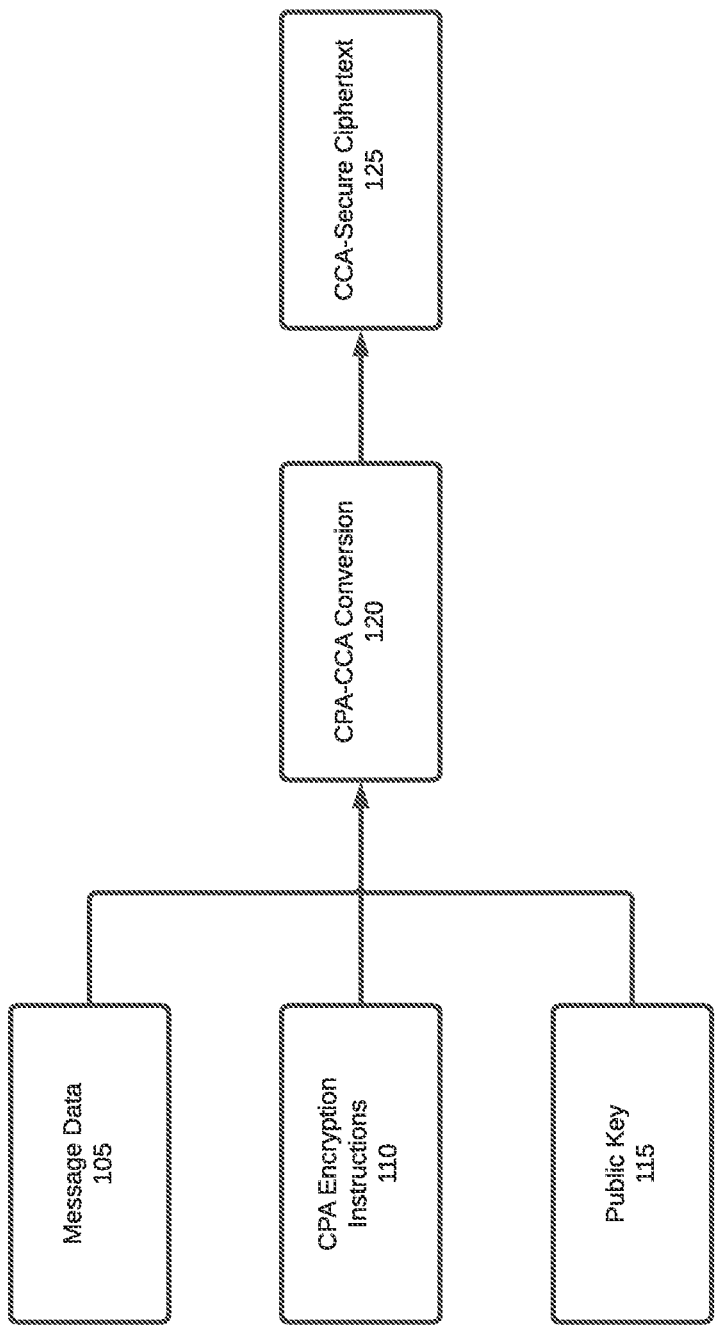
FIG. 1 illustrates an example system for encrypting a message to be CCA secure using originally CPA-secure infrastructure.

With reference to FIG. 1, message data (105) may be provided to the conversion module (120), along with executable CPA-secure encryption instructions (110), and a public key (115). In some embodiments, the public key may have been previously distributed to a user in association with pre-existing PKI. As used herein, a message to be processed may be any computer-recorded or computer-recordable information, whether characterized as instructions or data. As non-limiting examples of data, the message information could be content, such as numeric, text, dates, graphics and sound information. The CPA encryption instructions can be provided to the system in any form which permits their eventual execution by the conversion module. As non-limiting examples, the instructions could be in any form capable of being performed on a computerized processor, including compiled or binary instructions, or statements that are interpreted before being executed on a processor as part of a computer hardware conversion module.

With these inputs, the conversion module then generates a CCA-secure ciphertext as output. Further description of the conversion module is provided below, with specific reference to the separate CCA1 and CCA2 embodiments.

Summary of Systems and Methods for CCA1 and CCA2

Embodiments of the invention include systems and methods for generating a chosen ciphertext attack (CCA) secure message using a chosen plaintext attack (CPA) encryption scheme. The systems and methods can be configured for: receiving a plaintext message for encryption; receiving an encryption algorithm, wherein the algorithm comprises computer-readable instructions that when executed are capable of producing a ciphertext that is CPA secure; executing a hinting pseudorandom generator on a random seed to generate a pseudorandom encoding of the seed, and computing a one-time pad encryption c of the plaintext message using the pseudorandom encoding; generating a set S of equivocal commitments having openings to each bit of the seed, wherein an equivocal commitment is an unkeyed encryption of the seed with usual equivocal properties; executing the encryption algorithm on the equivocal commitment openings and a selected part of the pseudorandom encoding to obtain a set of ciphertexts $C_0$; generating a set of specific commitments $C_1$ to the equivocal commitment openings and the selected part of the pseudorandom encoding, wherein the commitment is an unkeyed encryption; and outputting public parameters of the hinting pseudorandom generator, the one-time pad encryption c, the set S of equivocal commitments, the set of ciphertexts $C_0$, and the set of commitments $C_1$ as a CCA secure ciphertext output.

Further embodiments of the invention can include selecting the part of the pseudorandom encoding by: parsing the pseudorandom encoding as comprising of (n+1) parts, where n is a length of the hinting pseudorandom generator seed; for each bit i of the hinting pseudorandom generator seed: if the bit is 0, generating ciphertext $c_{0,i}$ by executing the encryption algorithm with randomness that is set to the $i^{th}$ part of the pseudorandom encoding, and generating commitment $c_{1,i}$ by executing the commitment algorithm with respect to uniform randomness; if the bit is 1, generating ciphertext $c_{0,i}$ by executing the encryption algorithm with uniform randomness and generating commitment $c_{1,i}$ by executing the commitment algorithm with randomness that is set to the $i^{th}$ part of the pseudorandom encoding; and setting $C_0$ to be the set of ciphertexts $c_{0,i}$ for every i, and $C_1$ to be the set of commitments $c_{1,i}$ for every i.

Embodiments of the invention include systems and methods for decrypting the ciphertext, the ciphertext having been encrypted according to a chosen ciphertext attack secure adaptation of a chosen plaintext attack (CPA)-secure encryption scheme. The systems and methods can be configured for: receiving secret key sk for the CPA-secure encryption scheme; receiving a ciphertext comprising hinting pseudorandom generator public parameters, a one-time pad encryption c, a set S of equivocal commitments, a set of ciphertexts $C_0$ and a set of commitments $C_1$; recovering a candidate hinting pseudorandom generator seed d bit-by-bit by performing for each i the following steps: computing $m_i$ by decrypting the ciphertext $c_{0,i}$ in the set $C_0$ using secret key sk; setting $d_i=0$ if $m_i$ is a valid opening to 0 of the equivocal commitment, otherwise setting $d_i=1$; checking the candidate seed d by executing a check algorithm; and decrypting the one-time pad component of the ciphertext by using the candidate seed.

In further embodiments the check algorithm for checking the candidate seed further comprises: generating a pseudorandom encoding of the candidate seed; for each bit i of the candidate hinting pseudorandom generator seed: if the bit is 0, recovering a candidate m from the ciphertext $c_{0,i}$ by executing the CPA randomness recovery algorithm with randomness r that is set to the $i^{th}$ part of the pseudorandom encoding, and checking if: the first bit of m is 0, and the ciphertext $c_{0,i}$ is generated by executing the CPA encryption algorithm with respect to m and r; and m is an opening to the $i^{th}$ equivocal commitment; if all checks pass, continuing, otherwise outputting decryption failure; if the bit is 1, recovering a candidate m from the commitment $c_{1,i}$ by executing the commitment randomness recovery algorithm with randomness r that is set to the $i^{th}$ part of the pseudorandom encoding, and checking if: the first bit of m is 1; and the commitment $c_{1,i}$ is generated by executing the CPA encryption algorithm with respect to m and r; and m is an opening to the $i^{th}$ equivocal commitment; if all checks pass, continuing, otherwise outputting decryption failure; if all checks pass, the check algorithm continues to decryption, and otherwise outputs decryption failure.

CCA1 Adaptation

In the case of CCA1 adaptation, specific CCA1 encryption and decryption routines can be executed by the conversion module. In some embodiments, the specific commitment scheme used to generate the set $C_1$ is any non-interactive perfectly binding commitment scheme without setup, resulting in a CCA1 secure encryption scheme.

CCA1 Adaptation: Encryption

The CCA1 secure public key encryption scheme $PKE_{CCA1}$=(KeyGen, CCA. Enc, CCA. Dec) with message space $\ell(\kappa)$ is illustrated in FIG. 2. The dependence of $\ell$ on $\kappa$ is not illustrated for simplicity of notation.

For these embodiments, let e>0 be a constant. One embodiment includes a construction of an IND-CCA1 secure encryption system that uses any $2^{\kappa^e}$-CPA compatible KeyGen algorithm. This construction also relies on a hinting PRG, non-interactive binding commitments and subexponentially secure equivocal commitments.

With reference to FIGS. 2, 3, and 4 let (CPA. Enc, CPA. Dec) be the encryption and decryption algorithms of the non-uniform secure $T=2^{\kappa^e}$-INDCPA secure public key encryption scheme with randomness-recoverable ciphertexts and perfect decryption correctness. In addition, we will assume an equivocal commitment (Equiv. Com, Equiv. Decom, Equiv. Equivocate) that is also $T=2^{\kappa^e}$ secure (for the same e), a perfectly binding commitment scheme Com and a hinting PRG scheme HPRG=(HPRG. Setup, HPRG. Eval).

The security parameter of the commitment scheme can be set to be $\kappa^e$, so that the scheme can be broken in brute force in time $2^{\kappa^e}$. It will be assumed that the underlying encryption scheme has message space $\{0,1\}^{\lambda+1}$ and uses $\ell(\bullet)$ bits of randomness for encryption.

CCA1 Adaptation: Decryption

With reference to FIGS. 3 and 4, the decryption algorithm CCA. Dec computes d=PKE. Find(cca.pk, cca.sk, cca.ct) (where PKE. Find is defined in FIG. 3), and outputs PKE. Check(cca.pk, cca.ct, d) (where PKE. Check is defined in FIG. 4).

For decryption algorithm CCA. Dec(cca.sk, cca.pk, cca.ct), the ciphertext cca.ct can be parsed as (HPRG.pp, $1^n$, c, $(c_{0,i}, C_{1,i}, \sigma_i)_{i \in [n]}$) and cca.sk=cpa.sk.

CCA2 Adaptation

In the case of CCA2 adaptation, specific CCA2 encryption and decryption routines can be executed by the conversion module. In some embodiments, the specific commitment scheme used to generate the set $C_1$ is any non-interactive CCA2 commitment scheme without setup, resulting in a CCA2 secure encryption scheme.

CCA2 Adaptation: Encryption

A CCA secure public key encryption scheme $PKE_{CCA}$=(KeyGen, CCA. Enc, CCA. Dec) with message space $\{0,1\}^{\ell(\kappa)}$ is illustrated in FIG. 5. For simplicity of notation the dependence of $\ell$ on $\kappa$ is not illustrated. We will also assume that the CPA scheme has message space $\{0,1\}^{\kappa+1}$ and uses $\ell(\kappa)$ bits of randomness for encryption.

For these embodiments, let $\kappa$ denote the security parameter, $0<\delta<1$ be a constant and $\kappa'=\kappa^\delta$. One embodiment includes a construction of an IND-CCA2 secure encryption system that uses any $2^{\kappa'}$-CPA compatible KeyGen algorithm. This construction relies on a hinting PRG, non-interactive computation enabled CCA commitments and subexponentially secure equivocal commitments.

With reference to FIGS. 5, 6, and 7, let (CPA. Enc, CPA. Dec) be the encryption and decryption algorithms of the non-uniform $2^{\kappa'}$-INDCPA secure public key encryption scheme with randomness-recoverable ciphertexts and perfect decryption correctness. Some embodiments can further include:

An equivocal commitment (Equiv. Com, Equiv. Decom, Equiv. Equivocate) that is $T=2^{\kappa'}$ binding secure.

A $2^{\kappa'}$-secure hinting PRG scheme HPRG=(HPRG. Setup, HPRG. Eval) against non-uniform adversaries.

A non-interactive e-computation enabled CCA commitment scheme represented by algorithms (CCA. Com, CCA-Com. Val, CCACom. Recover), with security parameter $\kappa'$ and with e=1/$\delta$ (for the same $\delta$), such that the commitment scheme can be broken in brute force in time $2^{\kappa'}$.

An existentially unforgeable under chosen message attack (EUF-CMA) signature scheme with (Signature. Setup, Sign, Verify) with security parameter $\kappa'$.

CCA2 Adaptation: Decryption

With reference to FIGS. 6 and 7, the decryption algorithm CCA. Dec(cca.sk, cca.pk, cca.ct) parses ciphertext cca.ct as (vk, $\alpha$, $\tau$) where cca.sk=cpa.sk and $\alpha$=(HPRG.pp, $1^n$, c, $(c_{0,i}, c_{1,i}, \sigma_i)_{i\in[n]}$). Output $\perp$ if Verify(vk, $\alpha$, $\tau$)=0. Otherwise, set d=PKE. Find(cca.pk, cca.sk, $\alpha$) (where PKE. Find is defined in FIG. 6), and output PKE. Check(cca.pk, cca.ct, d) (where PKE. Check is defined in FIG. 7).

Hardware Overview

Figure 8:
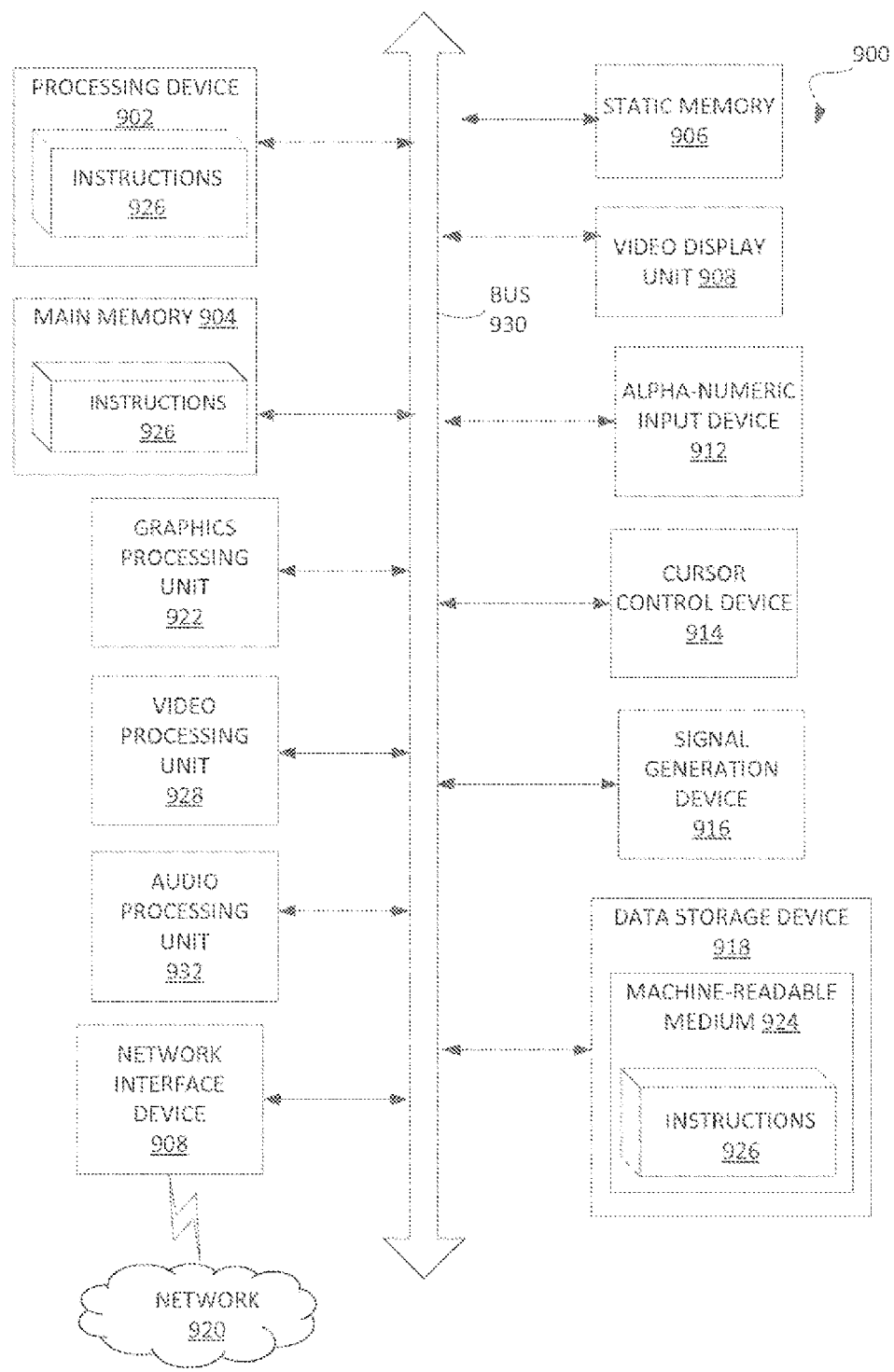
FIG. 8 illustrates further aspects of an example computerized system implementing systems and methods for encrypting a message to be CCA secure.
Figure 9:
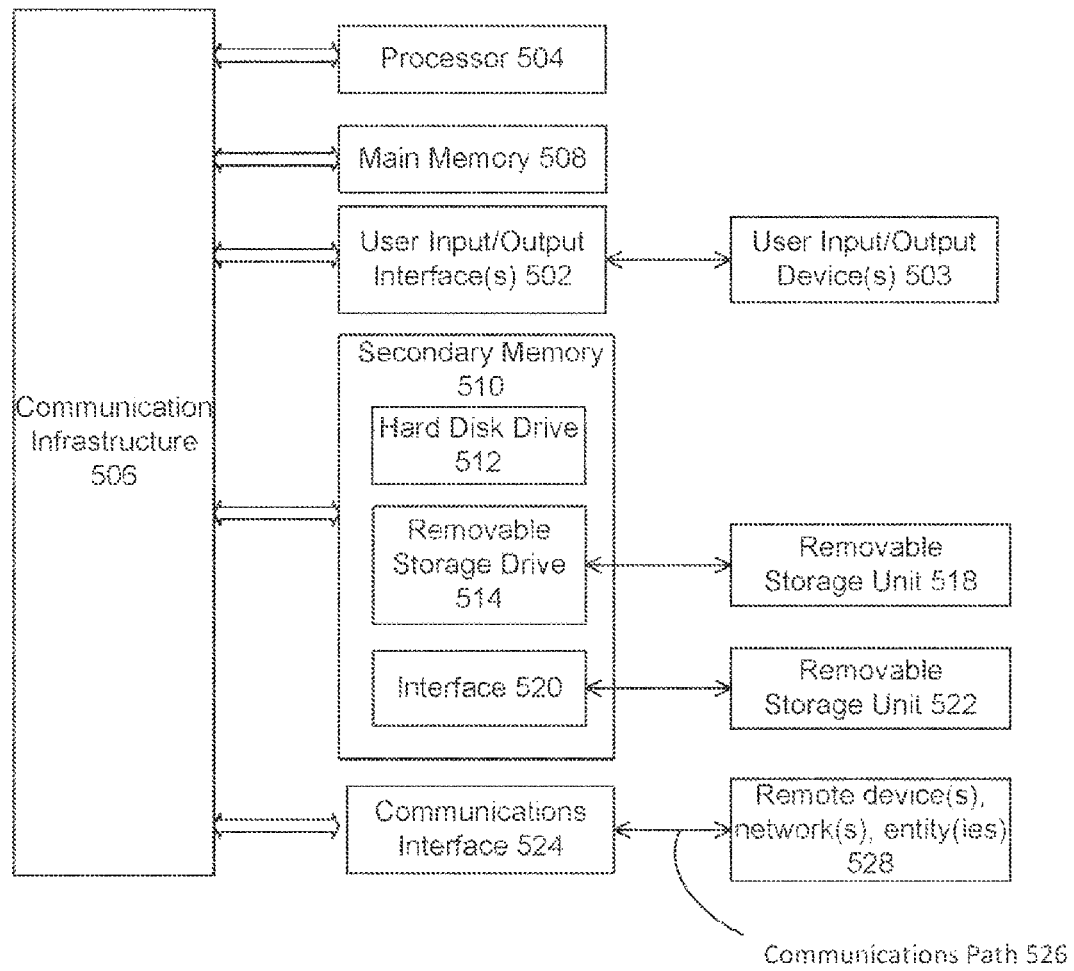
FIG. 9 illustrates further aspects of an example computerized system implementing systems and methods for encrypting a message to be CCA secure.

FIGS. 8 and 9 depict example computer systems useful for implementing various embodiments described in the present disclosure. Various embodiments may be implemented, for example, using one or more computer systems, such as computer system 500 shown in FIG. 9. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity (ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 8 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but is not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 8 and 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A method for generating a chosen ciphertext attack (CCA) secure message using a chosen plaintext attack (CPA) encryption scheme, the method comprising:

receiving, by a computerized processor coupled to a computerized memory, a plaintext message for encryption;

receiving, by the computerized processor, an encryption algorithm, wherein the algorithm comprises computer-readable instructions that when executed are capable of producing a ciphertext that is CPA secure;

executing, by the computerized processor, a hinting pseudorandom generator on a cryptographically secure pseudorandom seed to generate a pseudorandom encoding of the seed, and computing a one-time pad encryption c of the plaintext message using the pseudorandom encoding;

generating, by the computerized processor, a set S of equivocal commitments having openings to each bit of the seed, wherein an equivocal commitment is an unkeyed encryption of the seed with usual equivocal properties;

executing, by the computerized processor, the encryption algorithm on the equivocal commitment openings and a selected part of the pseudorandom encoding to obtain a set of ciphertexts $C_0$;

generating, by the computerized processor, a set of specific commitments $C_1$ to the equivocal commitment openings and the selected part of the pseudorandom encoding, wherein the commitment is an unkeyed encryption;

outputting, by the computerized processor, public parameters of the hinting pseudorandom generator, the one-time pad encryption c, the set S of equivocal commitments, the set of ciphertexts $C_0$, and the set of commitments $C_1$ as a CCA secure ciphertext output; and transmitting, by a network interface of the computerized processor, the CCA secure ciphertext output to a remote device over a network.

2. The method of claim 1, wherein selecting the part of the pseudorandom encoding is performed by:

parsing the pseudorandom encoding as comprising of (n+1) parts, where n is a length of the hinting pseudorandom generator seed;

for each bit i of the hinting pseudorandom generator seed:
  if the bit is 0, generating ciphertext $c_{0,i}$ by executing the encryption algorithm with randomness that is set to the $i^{th}$ part of the pseudorandom encoding, and generating a commitment $c_{1,i}$ by using uniform randomness;
  if the bit is 1, generating ciphertext $c_{0,i}$ by executing the encryption algorithm with uniform randomness and generating the commitment $c_{1,i}$ using randomness that is set to the $i^{th}$ part of the pseudorandom encoding; and
setting $C_0$ to be the set of ciphertexts $c_{0,i}$ for every i, and $C_1$ to be the set of commitments $c_{1,i}$ for every i.

3. The method of claim 1, wherein the specific commitment scheme used to generate the set $C_1$ is any non-interactive perfectly binding commitment scheme without setup, resulting in a CCA1 secure encryption scheme.

4. The method of claim 1, wherein the specific commitment scheme used to generate the set $C_1$ is any non-interactive CCA2 commitment scheme without setup, resulting in a CCA2 secure encryption scheme.

5. A method for decrypting a ciphertext, the ciphertext having been encrypted according to a chosen ciphertext attack secure adaptation of a chosen plaintext attack (CPA)-secure encryption scheme, the method comprising:
  receiving, by a network interface of a computerized device, the ciphertext;
  storing the received ciphertext in a memory of the computerized device;
  receiving secret key sk for the CPA-secure encryption scheme;
  parsing, by a processor of the computerized device, the ciphertext stored in the memory as comprising hinting pseudorandom generator public parameters, a one-time pad encryption c, a set S of equivocal commitments, a set of ciphertexts $C_0$ and a set of commitments $C_1$;
  recovering, by the processor, a candidate hinting pseudorandom generator seed d bit-by-bit by performing for each i the following steps:
  computing $m_i$ by decrypting the ciphertext $c_{0,i}$ in the set $C_0$ using secret key sk;
    setting $d_i=0$ if $m_i$ is a valid opening to 0 of the equivocal commitment, otherwise setting $d_i=1$;
  checking the candidate seed d by executing a check algorithm, wherein the check algorithm includes a CPA randomness recovery algorithm;
  decrypting the one-time pad component of the ciphertext by using the candidate seed; and
  storing the decrypted message in the memory of the computerized device.

6. The method of claim 5, wherein the check algorithm for checking the candidate seed further comprises:
  generating a pseudorandom encoding of the candidate seed;
  for each bit i of the candidate seed:
    if the bit is 0, recovering a candidate m from the ciphertext $c_{0,i}$ by executing the CPA randomness recovery algorithm with randomness r that is set to the $i^{th}$ part of the pseudorandom encoding, and checking if:
      the first bit of m is 0, and
      the ciphertext $c_{0,i}$ is generated by executing the CPA encryption algorithm with respect to m and r; and
      m is an opening to the $i^{th}$ equivocal commitment;
    if all checks pass, continuing, otherwise outputting decryption failure;
    if the bit is 1, recovering a candidate m from the commitment $c_{1,i}$ by executing the CPA randomness recovery algorithm with randomness r that is set to the $i^{th}$ part of the pseudorandom encoding, and checking if:
      the first bit of m is 1; and
      the commitment $c_{1,i}$ is generated by executing the CPA encryption algorithm with respect to m and r; and
      m is an opening to the $i^{th}$ equivocal commitment;
    if all checks pass, continuing, otherwise outputting decryption failure;
  if all checks pass, the check algorithm continues to decryption, and otherwise outputs decryption failure.

7. A system for generating a chosen ciphertext attack (CCA) secure message using a chosen plaintext attack (CPA) encryption scheme, the system comprising:
  a computerized processor coupled to a computerized memory, the computerized processor configured for:
  receiving a plaintext message for encryption;
    receiving an encryption algorithm, wherein the algorithm comprises computer-readable instructions that when executed are capable of producing a ciphertext that is CPA secure;
  executing a hinting pseudorandom generator on a cryptographically secure pseudorandom seed to generate a pseudorandom encoding of the seed, and computing a one-time pad encryption c of the plaintext message using the pseudorandom encoding;
  generating a set S of equivocal commitments having openings to each bit of the seed, wherein an equivocal commitment is an unkeyed encryption of the seed with usual equivocal properties;
  executing the encryption algorithm on the equivocal commitment openings and a selected part of the pseudorandom encoding to obtain a set of ciphertexts $C_0$;
  generating a set of specific commitments $C_1$ to the equivocal commitment openings and the selected part of the pseudorandom encoding, wherein the commitment is an unkeyed encryption;
  outputting public parameters of the hinting pseudorandom generator, the one-time pad encryption c, the set S of equivocal commitments, the set of ciphertexts $C_0$, and the set of commitments $C_1$ as a CCA secure ciphertext output; and
  transmitting, by a network interface of the computerized processor, the CCA secure ciphertext output to a remote device over a network.

8. The system of claim 7, wherein selecting the part of the pseudorandom encoding is performed by:
  parsing the pseudorandom encoding as comprising of (n+1) parts, where n is a length of the hinting pseudorandom generator seed;
  for each bit i of the hinting pseudorandom generator seed:
    if the bit is 0, generating ciphertext $c_{0,i}$ by executing the encryption algorithm with randomness that is set to the $i_{th}$ part of the pseudorandom encoding, and generating a commitment $c_{1,i}$ using uniform randomness;
    if the bit is 1, generating ciphertext $c_{0,i}$ by executing the encryption algorithm with uniform randomness and generating the commitment $c_{1,i}$ using randomness that is set to the $i^{th}$ part of the pseudorandom encoding; and
  setting $C_0$ to be the set of ciphertexts $c_{0,i}$ for every i, and $C_1$ to be the set of commitments $c_{1,i}$ for every i.

9. The system of claim 7, wherein the specific commitment scheme used to generate the set $C_1$ is any non-interactive perfectly binding commitment scheme without setup, resulting in a CCA1 secure encryption scheme.

10. The system of claim 7, wherein the specific commitment scheme used to generate the set $C_1$ is any non-interactive CCA2 commitment scheme without setup, resulting in a CCA2 secure encryption scheme.

11. A system for decrypting a ciphertext, the ciphertext having been encrypted according to a chosen ciphertext attack secure adaptation of a chosen plaintext attack (CPA)-secure encryption scheme, the system comprising:
a computer processor configured for:
receiving, by a network interface of a computerized device, the ciphertext;
storing the received ciphertext in a memory of the computerized device;
receiving secret key sk for the CPA-secure encryption scheme;
parsing, by a processor of the computerized device, the ciphertext stored in the memory as comprising hinting pseudorandom generator public parameters, a one-time pad encryption c, a set S of equivocal commitments, a set of ciphertexts $C_0$ and a set of commitments $C_1$;
recovering, by the processor, a candidate hinting pseudorandom generator seed d bit-by-bit by performing for each i the following steps:
computing $m_i$ by decrypting the ciphertext $c_{0,i}$ in the set $C_0$ using secret key sk;
setting $d_i=0$ if $m_i$ is a valid opening to 0 of the equivocal commitment, otherwise setting $d_i=1$;
checking the candidate seed d by executing a check algorithm, wherein the check algorithm includes a CPA randomness recovery algorithm;
decrypting the one-time pad component of the ciphertext by using the candidate seed; and
storing the decrypted message in the memory of the computerized device.

12. The system of claim 11, wherein the check algorithm for checking the candidate seed further comprises:
generating a pseudorandom encoding of the candidate seed;
for each bit i of the candidate seed:
if the bit is 0, recovering a candidate m from the ciphertext $c_{0,i}$ by executing the CPA randomness recovery algorithm with randomness r that is set to the $i^{th}$ part of the pseudorandom encoding, and checking if:
the first bit of m is 0, and
the ciphertext $c_{0,i}$ is generated by executing the CPA encryption algorithm with respect to m and r; and
m is an opening to the $i^{th}$ equivocal commitment;
if all checks pass, continuing, otherwise outputting decryption failure;
if the bit is 1, recovering a candidate m from the commitment $c_{1,i}$ by executing the CPA randomness recovery algorithm with randomness r that is set to the $i^{th}$ part of the pseudorandom encoding, and checking if:
the first bit of m is 1; and
the commitment $c_{1,i}$ is generated by executing the CPA encryption algorithm with respect to m and r; and
m is an opening to the $i^{th}$ equivocal commitment;
if all checks pass, continuing, otherwise outputting decryption failure;
if all checks pass, the check algorithm continues to decryption, and otherwise outputs decryption failure.

13. The method of claim 1, wherein the hinting pseudorandom generator is subexponentially secure against non-uniform adversaries.

14. The method of claim 1, further comprising:
generating a signature key pair;
signing the ciphertext using the signature key pair; and
including the signature and verification key with the CCA secure ciphertext output.

15. The method of claim 5, wherein the check algorithm further comprises verifying a signature associated with the ciphertext using a verification key included with the ciphertext.

16. The method of claim 5, wherein the CPA-secure encryption scheme has perfect decryption correctness.

17. The system of claim 7, wherein the encryption algorithm is a public key encryption scheme with randomness-recoverable ciphertexts.

18. The system of claim 7, wherein the equivocal commitment scheme is subexponentially binding secure.

19. The system of claim 11, wherein the CPA randomness recovery algorithm recovers the randomness used in generating a ciphertext produced by the CPA-secure encryption scheme.

20. The system of claim 11, wherein the system is configured to operate on ciphertexts produced using public keys from a pre-existing public key infrastructure that satisfies only CPA security.

* * * * *